US009515850B2

United States Patent
Sahin et al.

(10) Patent No.: US 9,515,850 B2
(45) Date of Patent: Dec. 6, 2016

(54) NON-VALIDATED EMERGENCY CALLS FOR ALL-IP 3GPP IMS NETWORKS

(75) Inventors: Serdar Sahin, Plano, TX (US); Steven Nguyen, Plano, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 804 days.

(21) Appl. No.: 12/703,019

(22) Filed: Feb. 9, 2010

(65) Prior Publication Data

US 2011/0194553 A1 Aug. 11, 2011

Related U.S. Application Data

(60) Provisional application No. 61/153,347, filed on Feb. 18, 2009.

(51) Int. Cl.
*H04W 76/00* (2009.01)
*H04L 12/66* (2006.01)
*H04W 4/22* (2009.01)
*H04W 12/06* (2009.01)

(52) U.S. Cl.
CPC ............... *H04L 12/66* (2013.01); *H04W 4/22* (2013.01); *H04W 76/007* (2013.01); *H04W 12/06* (2013.01)

(58) Field of Classification Search
CPC ......... H04L 12/66; H04W 12/06; H04W 4/22; H04W 76/007
USPC ........................................ 370/352; 455/404.1
See application file for complete search history.

(56) References Cited

U.S. PATENT DOCUMENTS

| | | | |
|---|---|---|---|
| 6,799,155 B1 * | 9/2004 | Lindemann et al. | 703/24 |
| 6,957,060 B1 | 10/2005 | Sharp | |
| 2002/0142805 A1 | 10/2002 | Pecen et al. | |
| 2004/0192251 A1 * | 9/2004 | Zhao et al. | 455/404.1 |
| 2004/0192252 A1 | 9/2004 | Aerrabotu et al. | |

* cited by examiner

*Primary Examiner* — Khaled Kassim

(57) ABSTRACT

An emergency call in an all Internet Protocol (IP) network having GPRS access is able to be completed without a valid SIM. A valid Subscriber Identity Module is substituted for the missing or invalid SIM only when an emergency call is attempted. The emergency call is either sent via an IMSI from an embedded SIM provided by the UE making the emergency call, or the emergency call is modified with an IMSI substituted by an Emergency SIM Pool Function prior to being sent to the HLR for validation. The SIM is valid for the UE's emergency call so the emergency call is completed because the UE is considered validated by the network.

16 Claims, 5 Drawing Sheets

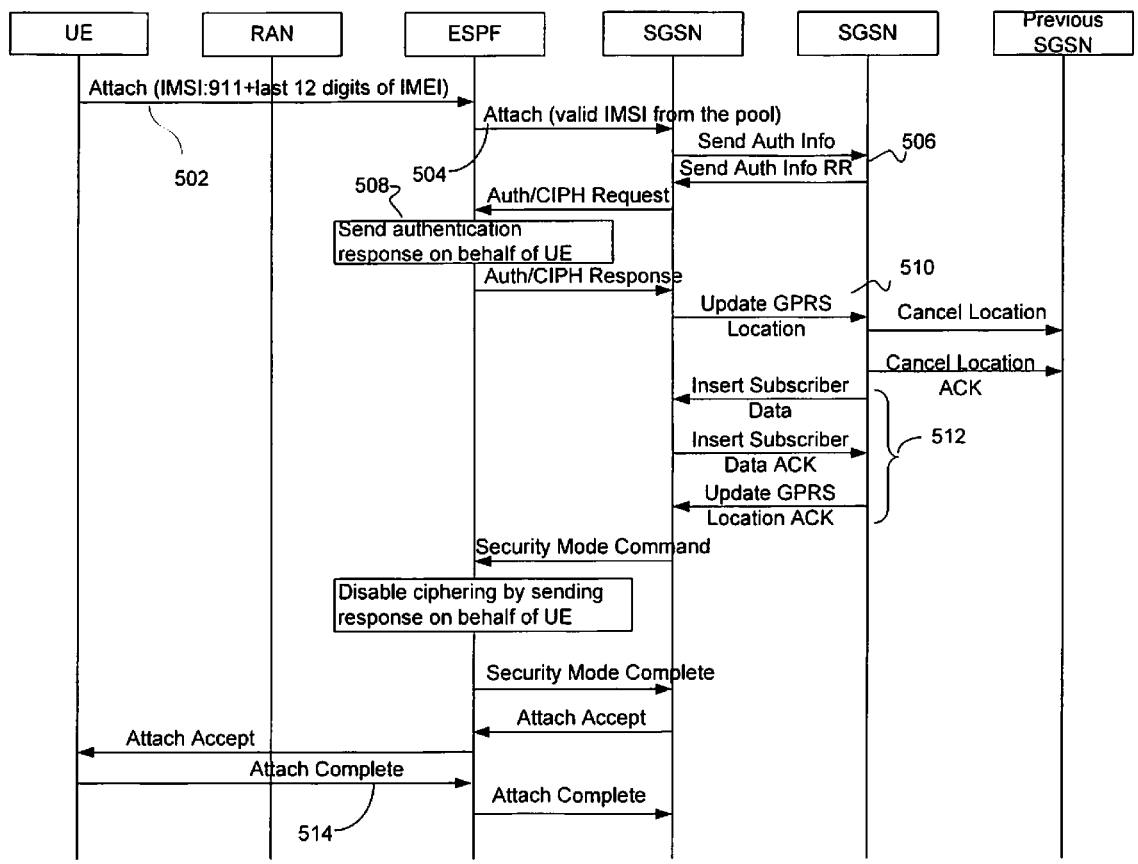
FIGURE 5 (Call Flow with ESPF)

NON-VALIDATED EMERGENCY CALLS FOR ALL-IP 3GPP IMS NETWORKS

This application claims the benefit of U.S. Provisional Application No. 61/153,347, filed Feb. 18, 2009, the disclosure of which is fully incorporated herein by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention relates to communications in an Internet Protocol (IP) network. More particularly, and not by way of limitation, the present invention is directed to a system and method for facilitating an emergency call in an IP network.

IMS emergency services are currently supported via the Emergency-Call Session Control Function (E-CSCF), refer to, which is described in 3GPP TS 24.229, section 5.1.6 as emergency registration and session establishment at IMS level. In other words, non-validated Emergency Calls at the IMS level are allowed.

However, in a pure cellular all-IP 3GPP IMS network, first Attach and PDP Context Activation are required prior to any calls, both of which depend on the availability of a valid SIM card in the mobile and a valid subscription in the home HLR or roaming partner's HLR.

In addition, Attach and PDP Context Activation without a SIM card or valid registration for Emergency Calls is not yet standardized (3GPP R7 or R8; see 3GPP TS 23.167 Annex E). 3GPP standards currently assume that a circuit switched network is available to be used for cellular based calls and therefore does not address how a pure IMS based 3GPP cellular system would satisfy the Emergency Calls requirements, specifically for non-validated access.

It would be advantageous to have a system and method for providing an emergency call connection that overcomes the disadvantages of the prior art. The present invention provides such a system and method.

BRIEF SUMMARY OF THE INVENTION

The present invention provides a method for completing an emergency call in an all Internet Protocol (IP) network having GPRS access.

If an emergency call is made by a UE that has an invalid SIM card, or is missing the SIM card, the call is not completed because of this problem. So, in the present invention a valid, substitute Subscriber Identity Module is made available for use with a User Equipment (UE) that is missing a SIM card or has an invalid SIM card.

When an emergency call request is made to the IP network, the normal procedure of determining if the call has a valid SIM card is begun. If the UE is either lacking a SIM card or the SIM card that is present is invalid, (bills not paid, wrong SIM for the UE, etc.) a valid IMSI is substituted for the missing or invalid SIM. The emergency call request along with the substituted, valid IMSI is forwarded to the IMS network's HLR. Since the substitute IMSI is valid according to the HLR, it is then authenticated and the emergency call is routed to the appropriate Public Safety Answering Point.

In another aspect, the present invention is directed to a method for completing an emergency call in an all Internet Protocol (IP) network having GPRS access, where a pool of virtual SIMs, i.e. IMSIs and accompanying credentials, are designated as an Emergency SIM Pool Function (ESPF).

A pool of valid SIMs are set aside by the operator of the subject network. When an emergency call, which includes an International Mobile Subscriber Identity (IMSI), is detected in the network and the UE making the call either lacks a SIM card or the SIM card is invalid for some reason, the UE's home HLR does not authenticate the UE. The rejection is returned to the UE and the UE has instructions that cause the emergency number concatenated with IMEI to be substituted for the IMSI, which is utilized in conjunction with the emergency call request and retransmitted. The ESPF detects the emergency call with the new IMSI and from a pool of virtual SIMs set aside by the operator for this reason, substitutes a valid IMSI before forwarding the new emergency call to the IMS network's HLR. The UE may be roaming in the IMS network, so the first emergency call request goes to the UE's home network for verification. After refusal and the substitution being made, the second emergency call request is routed through the ESPF which provides a valid IMSI from IMS network's virtual SIM pool. Since the IMS network has supplied the valid virtual SIMs to the ESPF, the substituted SIM is authenticated by the IMS network. The emergency call is then completed by routing the authenticated emergency request message to a Public Safety Answering Point (PSAP).

In yet another aspect, the present invention is directed to a method for completing an emergency call by a UE in an all Internet Protocol (IP) network having GPRS access, where an additional "emergency" SIM is embedded in the UE during the manufacturing process. The embedded SIM is available only when the UE's primary SIM is either absent or invalid.

When the UE makes an emergency call and the SIM is unavailable, the UE then accesses the embedded SIM which attaches the IMSI provided by the embedded SIM. The emergency call is sent to the RAN and SGSN which has the embedded SIM validated by the network HLR and forwards the emergency call to the PSAP.

BRIEF DESCRIPTION OF THE SEVERAL VIEWS OF THE DRAWING

In the following section, the invention will be described with reference to exemplary embodiments illustrated in the figures, in which:

FIG. 5 illustrates a signaling diagram of call flow using ESPF in accordance with an embodiment of the present invention.

DETAILED DESCRIPTION OF THE INVENTION

Figure 1:
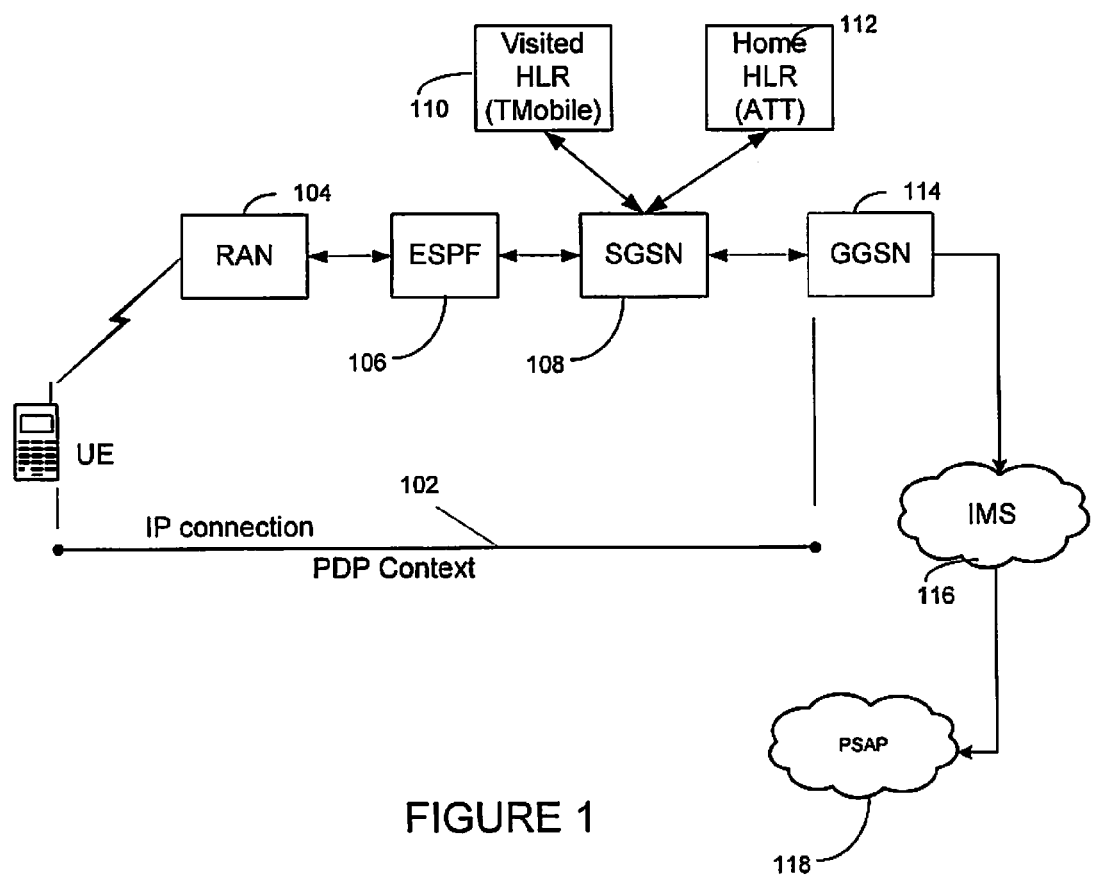
FIG. 1 depicts a high-level block diagram of an IMS 3GPP network in accordance with an embodiment of the present invention.

FIG. 1 depicts a high-level block diagram of an IMS 3GPP network in accordance with an embodiment of the present invention. The present invention provides a substitute SIM to provide non-validated Emergency Calls in a pure VoIP IMS based 3GPP based network A packet data protocol (PDP) context 102 is a data structure present on both a Serving GPRS Support Node (SGSN) and the Gateway GPRS Support Node (GGSN) which contains a subscriber's session information when the subscriber has an active session. When a mobile wants to use GPRS, it must first attach and then activate a PDP context as an initial step. This allocates a PDP context data structure in the SGSN that the subscriber is currently visiting and in the GGSN serving the subscriber's access point. The data recorded includes:

Subscriber's IP address,
Subscriber's IMSI, and
Subscriber's Tunnel Endpoint ID (TEID) at the GGSN which is a number allocated by the GGSN which identifies the tunneled data related to a particular PDP context.

There are two kinds of PDP contexts. A primary PDP context has a unique IP address associated with it. A secondary PDP context shares an IP address with another PDP context and is created based on an existing PDP context (to share the IP address). Secondary PDP contexts may have a different quality of service settings. A total of 11 PDP contexts (with any combination of primary and secondary) can co-exist. NSAPI (Network Service Access Point Identifier) are used to differentiate the different PDP context.

Figure 4:
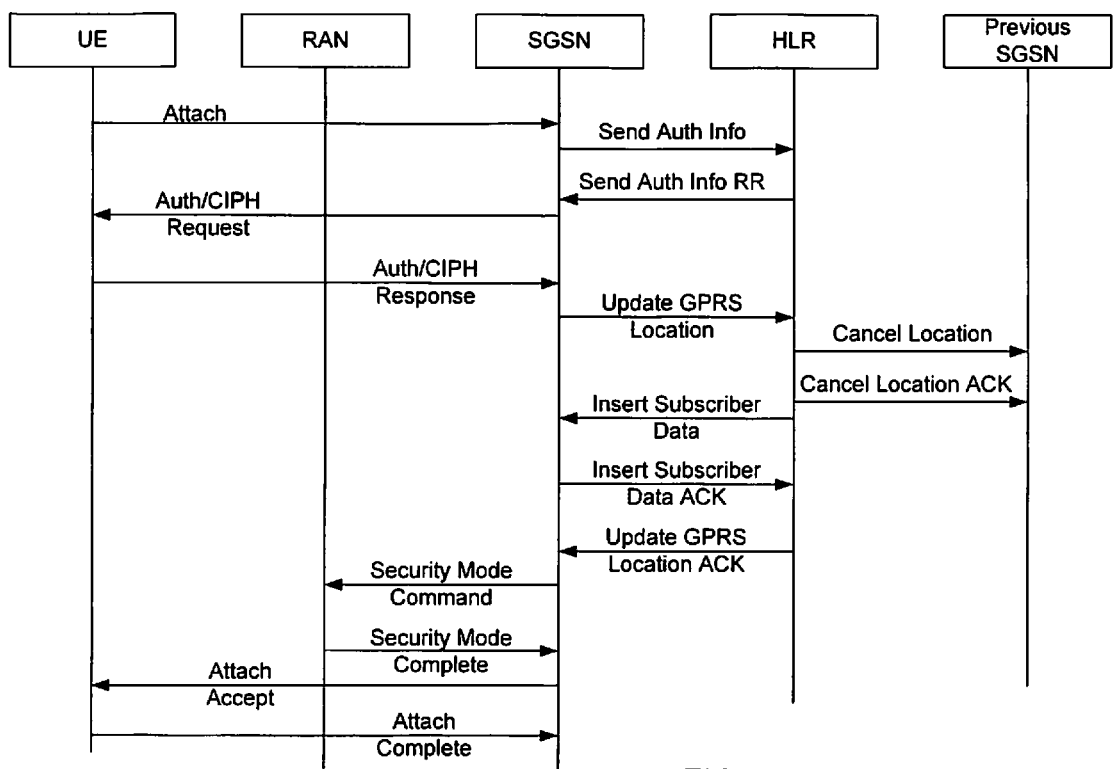
FIG. 4 depicts a high-level flow diagram of the current attach procedure from a User Equipment with a SIM.

Referring to FIG. 4 and FIG. 1, when a UE, either in a home network or a visited network, attempts to connect to the IP network via GPRS, the UE sends an Attach message for activating a primary PDP context 102 to SGSN 108 via Radio Access Node (RAN) 104. Assuming the UE is validated through a valid SIM card, whether in a home or visited network, SGSN 108 then sends a request to the GGSN 114 to create a PDP context.

GGSN 114, replies with a create PDP context message to SGSN 108, where SGSN 108 sends a RAB assignment request to the RAN and receives the message that the RAB assignment is complete. GGSN 114 then sends PDP Context Accept containing the P-CSCF address and an IP address to the UE. This procedure provides a connection from the UE to IMS network (116). This is the same procedure followed when the UE makes an emergency call. However, because of the problems involved when the UE is lacking a valid SIM card or even lacking a SIM card, this procedure fails for lack of validating the UE.

ESPF 106 is in position to detect the phone call and determine whether UE's SIM card is valid or missing. When the UE's SIM, or lack of it, is presented to the UE's home HLR 112, the HLR rejects the SIM and the UE is informed of the non-validation. The UE includes a module that repeats the emergency Attach request by modifying the emergency message by concatenating the UE's IMEI to the emergency message instead of the IMSI, which is the normal identifier. ESPF 106 detects this condition—emergency call with the concatenated IMEI, instead of the normal IMSI—and this triggers the ESPF to retrieve a valid SIM IMSI from SIM pool 107. SIM pool 107 contains valid IMSIs that are used strictly for this situation; a UE without a valid SIM. SIM pool 107 is equal to the number of VoIP ports in RAN 104 so that all ports can be supported even if they are all used for Emergency Calls.

A subscriber identity module (SIM) on a removable SIM card securely stores the service-subscriber key (IMSI) used to identify a subscriber on mobile telephony devices (such as computers and mobile phones). The SIM card allows users to change phones by simply removing the SIM card from one mobile phone and inserting it into another mobile phone or broadband telephony device. The SIM card contains its unique serial number, international unique number of the mobile subscriber (IMSI), security authentication and ciphering information, temporary information related to the local network (also temporary local id that has been issued to the user), a list of the services the user has access to and two passwords (PIN for usual use and PUK for unlocking).

ESPF 106 substitutes the valid SIM for the invalid SIM to authenticate the UE with visited HLR 110, e.g., TMobile. Since the SIM is valid, HLR 110 authenticates the SIM to the SGSN which then activates a PDP Context between the UE and SGSN. From there, the emergency call is completed to PSAP via the GGSN and IMS Infrastructure.

Figure 2:
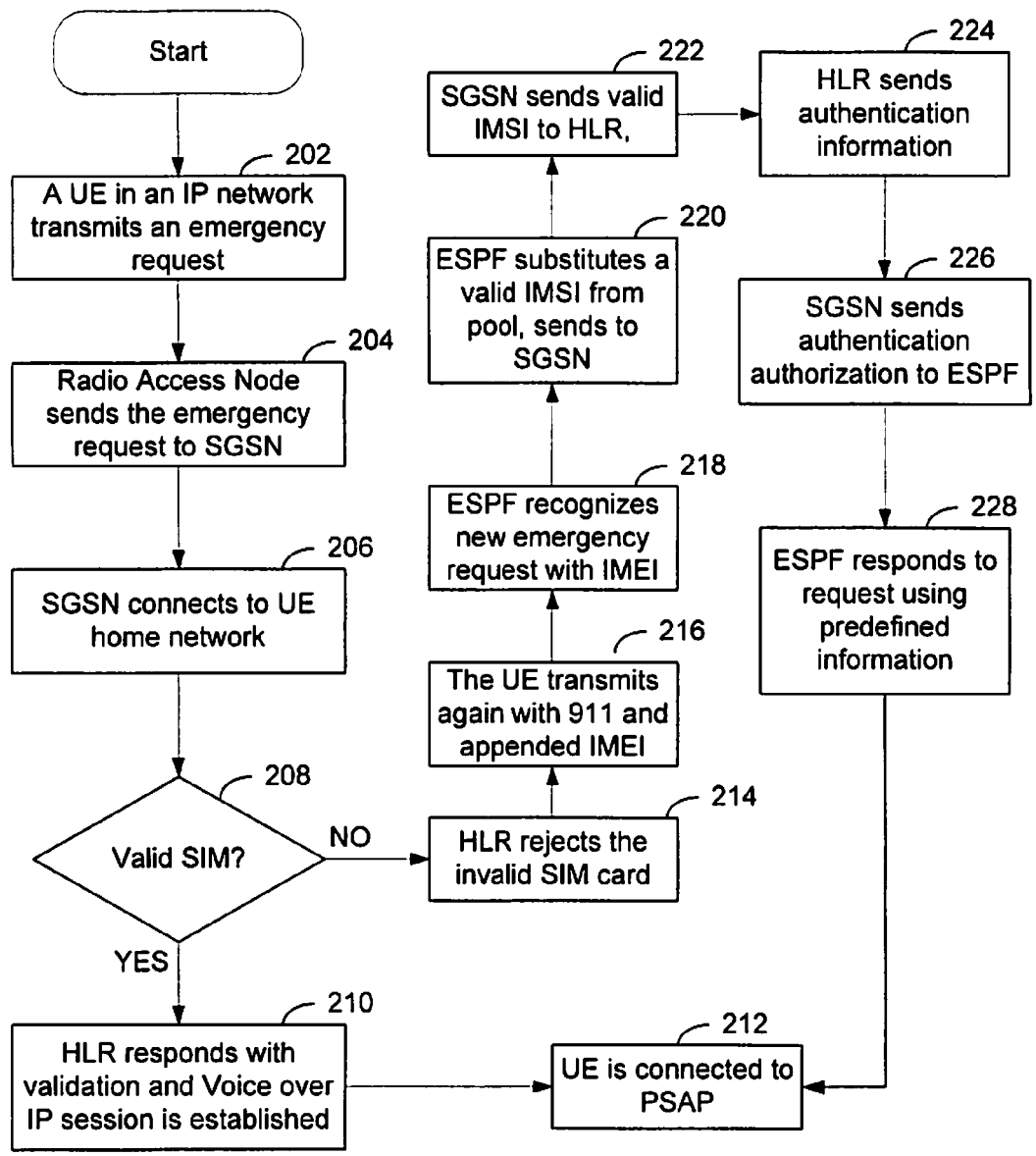
FIG. 2 illustrates a high-level flow diagram of an emergency call procedure from a User Equipment lacking a SIM in accordance with an embodiment of the present invention.

FIG. 2 illustrates a high-level flow diagram of an emergency call procedure from a User Equipment lacking a SIM in accordance with an embodiment of the present invention. The process begins with step 202 when a User Equipment transmits an emergency request. When an emergency request is made Attach and PDP Context Activation are executed by the UE if the UE has a valid SIM Card and a valid subscription. When a valid SIM card or valid subscription is not available, according to current IMS standards, the UE emergency request is rejected.

The process proceeds to step 204 when the emergency request is received by a Radio Access Node (RAN), which sends the request to the Serving GPRS Support Node (SGSN). Next, the process moves to step 206, where the SGSN connects to the UE's home network HLR for determining whether a SIM presented by the UE is valid. A decision is made in step 208 whether the SIM is valid. If the decision is YES, the process moves to step 210 where the HLR sends a message back with validation for the UE and a PDP Context is established between the network and the UE, wherein the UE can then be connected in step 212 to a Public Safety Access Point. (PSAP)

On the other hand if the SIM is rejected by the UE's home HLR, the HLR sends a message rejecting the invalid SIM card. The SIM card could also be missing rather than invalid; the SGSN will still reject the emergency request in the absence of the present invention. Moving from step 214, the process moves from step 208 to step 214 where the UE has received the rejection message. The process then moves to step 216, where the UE transmits a modified emergency request message. The modification is made to the emergency request message by adding the UE's International Mobile Equipment Identity (IMEI) number to the emergency number, e.g. 911 plus the last 12 digits of the UE's IMEI.

As the new emergency request number is received by the RAN, the process moves next to step 218, ESPF detects the new number with the IMEI appended. This is an alert for the ESPF that the new request is for emergency call from a UE without a valid SIM. The ESPF modifies the emergency request once again in step 220 by substituting a valid IMSI.

The SGSN receives the valid call request in step 22 and sends the request to the HLR for authentication, only in this step, the valid call request is sent to the local network HLR. The UE, when roaming, is initially validated or rejected by the UE home HLR. This allows the UE to connect to the visited network. Also, if the home HLR rejects the UE, the UE is not allowed to connect to the visited network. HLR can be a home HLR or a visited HLR and when the HLR receives the new, validated request, the permission to connect will be granted.

After the HLR sends the authentication, in step 224, to the SGSN in the network in which the UE is present, the process proceeds to step 226 where the SGSN sends the authentication authorization through ESPF. At step 228, ESPF intercepts and responds to the request using predefined credentials for the substituted IMSI from the ESPF SIM pool.

ESPF can be implemented in RAN, SGSN or as a separate entity, depending on feasibility in a particular system. There is minimal support needed from the mobile. The mobile needs to send a predefined IMSI number, e.g. one composed of 911 plus last twelve digits from the IMEI for an Attach attempt which triggers from the action in the ESPF. ESPF recognizes the Attach attempt for Emergency Call and modifies Attach and PDP Context Request by inserting the IMSI/SRES/XRES where required in call flows progression.

The number of substitute subscription entries needed in HLR is not significant as only a number equal to the number of VoIP ports in RAN is required. This is usually an insignificant fraction of total number of subscribers. The ESPF or RAN will have to disable ciphering for these non-validated Emergency Calls since the credentials are not available in the mobile.

Figure 3:
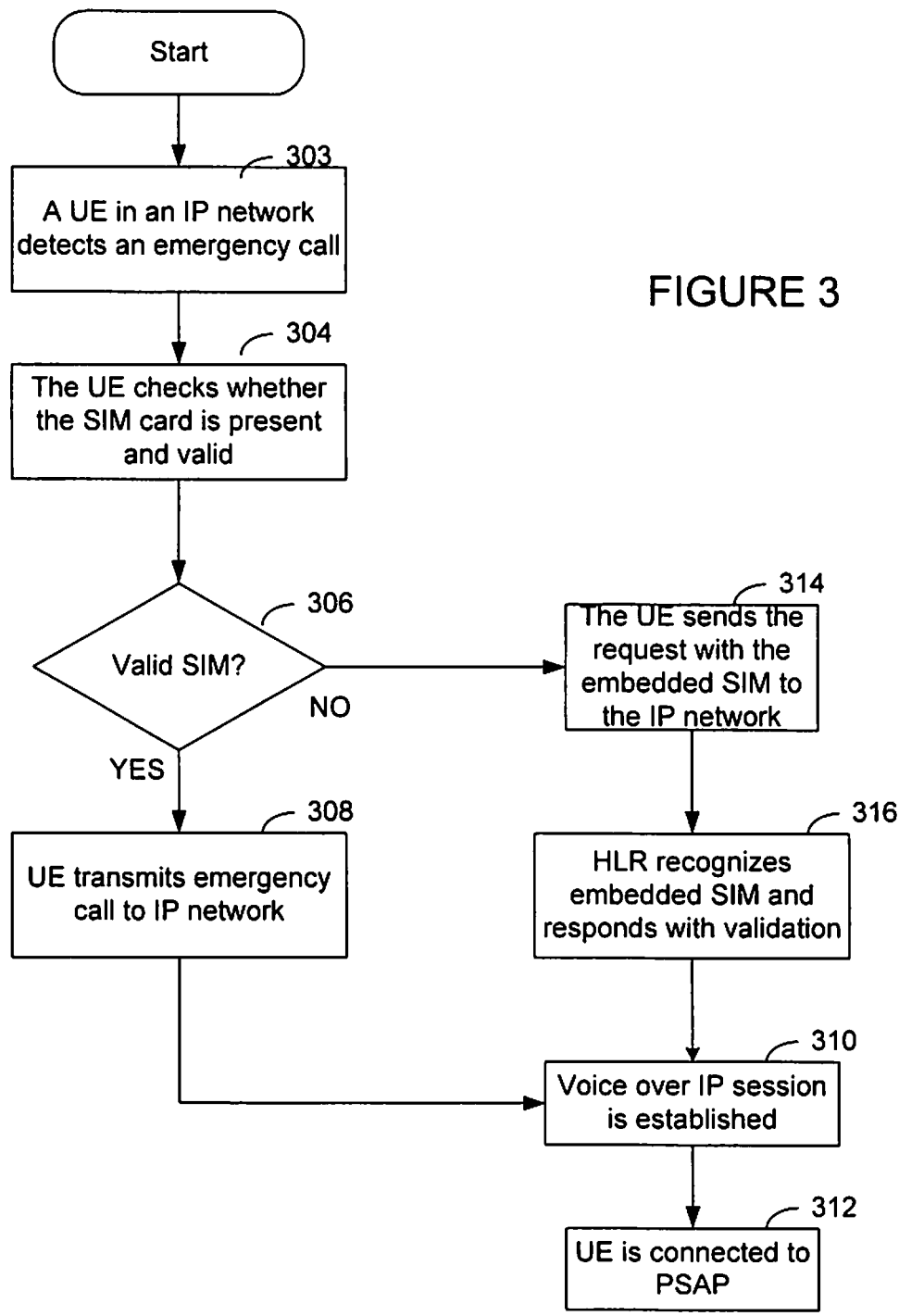
FIG. 3 depicts a high-level flow diagram of an emergency call procedure from a User Equipment either lacking or having an invalid SIM card in accordance with an embodiment of the present invention.

FIG. 3 depicts a high-level flow diagram of an emergency call procedure from a User Equipment either lacking or having an invalid SIM card in accordance with an embodiment of the present invention. In the first step 302 of the process, the UE recognizes the input of an emergency number, such as 911. The UE begins the process, in step 304, of determining whether the UE's SIM card is present and valid. Even if the SIM card is valid from the UE's perspective, it may still be invalid in the network. In step 306, the determination is made and if the SIM is valid, the process proceeds to step 308, where the UE sends the emergency call to the IP network in the normal manner. Next, in step 312, a Voice Over IP session is established. The process then moves to step 314, where the UE is connected to a Public Safety Access Point and the emergency call is connected.

On the other hand if the SIM is not deemed valid, the process moves from step 306 to step 316 where the UE has detected the invalidity of the SIM card and substitutes the IMSI of the embedded SIM, which is presented to the network. As this SIM can be authenticated, the credentials being available in the UE, the process then moves to step 310 where the HLR recognizes the SIM and responds with a validation. Next the process moves to step 312, to establish a VoIP session. In step 312, the UE is connected to the PSAP. The subscription tied to this embedded SIM card must be pre-provisioned correctly in the HLR.

When an Emergency Call is made where a UE lacks valid SIM information, i.e., when a valid SIM card or valid subscription is not available, the normal Attach and PDP Context Activation steps are executed by the mobile based on the "embedded SIM card". This only requires mobile support and provisioning in HLR, i.e. does not require an ESPF as described in FIGS. 1 and 2.

This embedded SIM doubles the number of subscriptions in HLR, as each mobile needs to be provisioned for the equipment (embedded SIM card) and for a regular SIM card that will be used by the subscriber.

FIG. 5 illustrates a diagram of call flow using ESPF in accordance with an embodiment of the present invention. When an emergency call, which includes an International Mobile Subscriber Identity (IMSI), is detected in the network and the UE making the call either lacks a SIM card or the SIM card is invalid for some reason, the UE's home HLR does not authenticate the UE. The rejection is returned to the UE and the UE has instructions that cause the emergency number, concatenated with IMEI to be substituted for the IMSI, which is utilized in conjunction with the emergency call request and retransmitted (502). The ESPF detects the emergency call with the new IMSI and from a pool of virtual SIMs set aside by the operator for this reason, substitutes a valid IMSI from the ESPF before forwarding the new emergency call to the IMS network's HLR (504).

The UE may be roaming in the IMS network, so the first emergency call request goes to the UE's home network for verification. After refusal and the substitution being made, the second emergency call request is routed through the ESPF which provides a valid IMSI from IMS network's virtual SIM pool. Since the IMS network has supplied the valid virtual SIMs to the ESPF, the substituted SIM is authenticated by the IMS network (506 and 508). After updating the GPRS and Location of the UE (510 and 512), the SGSN sends a Security mode command to the ESPF, which disables ciphering by responding on behalf of the UE. The ESPF completes the UE Attach process by sending an Attach message to the UE with responds with an Attach complete message which is forwarded to the SGSN by the ESPF (514). The emergency call is then completed by routing the authenticated emergency request message to a Public Safety Answering Point (PSAP).

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

ABBREVIATIONS

3GPP Third Generation Partnership Project
3P Third Party
DNS Domain Name Server
ESPF Emergency SIM Pool Function
SGSN Serving GPRS Support Node
GGSN Gateway GPRS Support Node
GPRS General Packet Radio Service
HLR Home Location Register
HSS Home Subscriber Server
IMEI International Mobile Equipment Identifier
IMS IP Multimedia Subsystem
IMSI International Mobile Subscriber Identity
MM Mobility Management
NSAPI Network Service Access Point Identifier
PDP Packet Data Protocol
PSAP Public-Safety Answering Point
RAN Radio Access Network
SIM Subscriber Identity Module
TS Technical Specification
UE User Equipment
UICC Universal Integrated Circuit Card
USIM Universal Subscriber Identity Module
VoIP Voice over IP

What is claimed:

1. A method for completing an emergency call in an all Internet Protocol (IP) network having GPRS access, the method comprising:

implementing, in a node in the IP network, a pool of stored, substitute Subscriber Identity Modules (SIMs) that are designated as an Emergency SIM Pool Function (ESPF);

receiving, at the node, an initial emergency call request message from a User Equipment (UE) with no SIM card or an invalid SIM card, the node being remote from the UE;

presenting the initial emergency call request message to the UE's home network HLR;

upon rejection of the initial emergency call request message as invalid, the ESPF intercepting a subsequent emergency call request message from the UE, the subsequent emergency call request message including an emergency IMSI formed by concatenating a portion of the International Mobile Equipment Identity (IMEI) of the UE with the subsequent emergency call request;

substituting a valid IMSI for the emergency IMSI using a SIM from the ESPF;

forwarding the subsequent emergency call request message with the valid IMSI to the IP network's HLR, wherein the valid IMSI is authenticated; and completing the emergency call by routing the authenticated emergency request message to a Public Safety Answering Point.

2. The method of claim 1, wherein the portion of the IMEI that is concatenated with the subsequent emergency call request message includes the last twelve digits of the IMEI.

3. The method of claim 1, wherein the pool of substitute SIMs comprises valid SIMs, set aside by the operator of the IP network, for the purpose of allowing a UE with an invalid or missing SIM card to complete an emergency call.

4. The method of claim 1, wherein the node is a Serving GPRS Support Node (SGSN), a Radio Access Network (RAN) node or a standalone node.

5. The method of claim 1, wherein, if the UE is in a visited network, the step of receiving the emergency call further comprises:

confirming with the UE's home network HLR if the SIM of the UE is valid and if so, directing the emergency call to a Public Safety Answering Point (PSAP);

sending the subsequent emergency call request message with the valid SIM to the visited network's SGSN.

6. The method of claim 4, the step of forwarding the call request with the valid SIM, further comprising;

receiving the authenticated emergency request message in the ESPF with the authenticated information for the RAN, wherein the ESPF responds to the authentication message from the SGSN with an expected response directly to the SGSN without routing through the RAN.

7. The method of claim 1, further comprising routing the call to the ESPF, the ESPF modifying Attach and PDP (Packet Data Protocol) Context Request messages by inserting IMSI/SRES/XRES (International Mobile Subscriber Identity)/(Signed RESponse)/(eXpected user RESponse) as required.

8. The method of claim 1, further comprising disabling ciphering for the emergency call.

9. A node in an IP network for completing an emergency call in an Internet Protocol (IP) network having GPRS access, the node comprising:

transceiver means for transmitting and receiving an emergency call request; and a processor utilizing stored instructions for:
receiving an initial emergency call request message from a User Equipment (UE) with no SIM card or an invalid SIM card, the node being from the UE:

presenting the initial emergency call request message to the UE's home network HLR;

upon rejection of the initial emergency call request message as invalid, intercepting a subsequent emergency call request message from the UE, the subsequent emergency call request message including an emergency IMSI formed by concatenating a portion of the International Mobile Equipment Identity (IMEI) of the UE with the subsequent emergency call request;

substituting a valid IMSI for the emergency IMSI using a SIM from a pool of substitute SIMs stored at the node;

forwarding the subsequent emergency call request with the valid IMSI to the IP network's HLR, wherein the valid IMSI is authenticated; and completing the emergency call by routing the authenticated emergency request message to a Public Safety Answering Point.

10. The node of claim 9, wherein the portion of the IMEI that is concatenated with the subsequent emergency call request message includes the last twelve digits of the IMEI.

11. The node of claim 9, wherein the pool of substitute SIMs comprises valid SIMs, set aside by the operator of the IP network, for the purpose of allowing a UE with an invalid or missing SIM card to complete an emergency call.

12. The node of claim 9, wherein the node is a Serving GPRS Support Node (SGSN), a Radio Access Network (RAN) node or a standalone node.

13. The node of claim 9, wherein, if the UE is in a visited network, the means for receiving the emergency call request further comprises:

means for confirming with the UE's home network HLR if the SIM of the UE is valid and if so, directing the emergency call to a Public Safety Answering Point (PSAP);

means for sending the subsequent emergency call request message with the valid SIM to the visited network's SGSN.

14. The node of claim 12, the step of forwarding the subsequent emergency call request with the valid IMSI, further comprising;

receiving the authenticated emergency request message with the authenticated information for the RAN and responding, to the authentication message from the SGSN with an expected response directly to the SGSN without routing through the RAN.

15. The node of claim 9, wherein the processor further utilizes stored instructions for:

modifying Attach and PDP (Packet Data Protocol) Context Request messages by inserting IMSI/SRES/XRES (International Mobile Subscriber Identity)/(Signed RESponse)/(eXpected user RESponse) as required.

16. The node of claim 9, further comprising means for disabling ciphering for the emergency call.

* * * * *